Jan. 7, 1969  E. F. MADDEN  3,419,965

PROFILE TRANSFERRING DEVICE

Original Filed April 2, 1962  Sheet 1 of 3

INVENTOR:
ERNEST F. MADDEN

INVENTOR:
ERNEST F. MADDEN

INVENTOR:
ERNEST F. MADDEN

United States Patent Office 3,419,965
Patented Jan. 7, 1969

1

3,419,965
PROFILE TRANSFERRING DEVICE
Ernest Francis Madden, 18 Compton Ave.,
Goring-by-Sea, Sussex, England
Continuation of application Ser. No. 534,958, Feb. 25,
1966, which is a division of application Ser. No.
360,623, Apr. 17, 1964, which is in turn a continuation
of application Ser. No. 184,172, Apr. 2, 1962. This
application Jan. 5, 1967, Ser. No. 607,580
Claims priority, application Great Britain, Apr. 7, 1961,
12,535/61, Patent 931,463
U.S. Cl. 33—175    3 Claims
Int. Cl. G01b 5/20

ABSTRACT OF THE DISCLOSURE

There is disclosed a profile transferring device in which a number of longitudinally movable resilient linear rods are held and disposed together in side by side relation through a clamping device so that the tips of the rods assume together the profile of any object against which they are pressed. The rods may be bent or flexed, and held by their own resilience or tendency to spring straight when bent, by the edges and shell of the clamping means which may include a fixed rigid integral projection bearing on the rods; by resilient rubber cross members within the clamping means; or by eccentric cam and roller means. Several individual devices may be connected in a chain.

---

Figure 1:
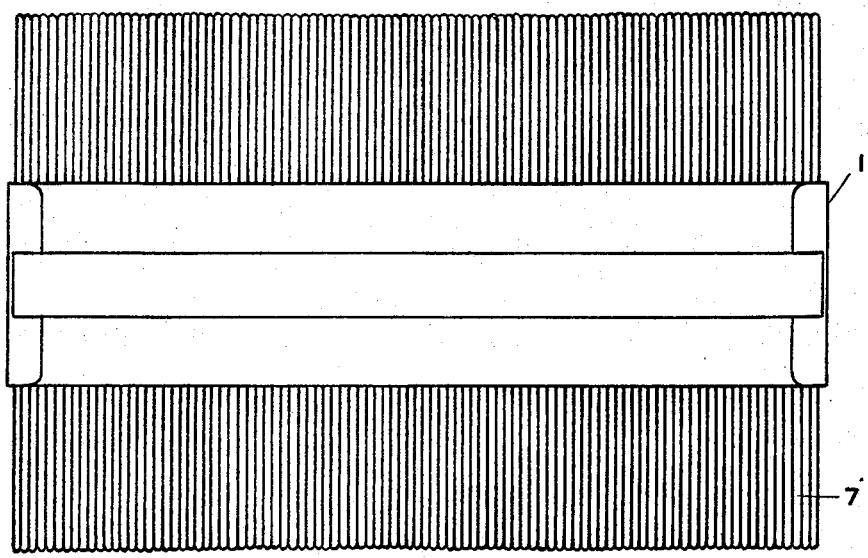

This is a continuation of my co-pending United States patent application No. 534,958 filed Feb. 25, 1966, now abandoned, which is a division of my now abandoned application No. 360,623 filed Apr. 17, 1964 which is a continuation of my now abandoned application No. 184,172 filed Apr. 2, 1962.

This invention relates to devices for application to non-regular or complex profiles to enable the contour to be transferred elsewhere.

The main object of the invention is to provide a profile transferring device of simple and robust nature for use as a tradesman's tool.

A second object is to provide a further improvement whereby the profile acquired is made available, in reverse, at the other end of the device.

According to the present invention, a profile transferring device comprises broadly a body, a plurality of rods arranged in the body in side by side relationship in one plane and longitudinally slidable through said body between two pairs of spaced guides and across a friction means engaged between the body and the rods, said friction means being disposed between the pairs of spaced guides. A bearing surface may be provided in said body opposite to said friction means, said rods being slidable between said bearing surface and said friction means.

The rods are set manually with their tips substantially aligned, and are then pushed against the profile until the whole of the contour has had at least one rod against it. The tips of the rods have then assumed the counterpart profile.

If the rods are long enough to project at both ends, and are of the same length, the tips remote from the profile automatically assume the corresponding contour.

If the length of the rods is the same as a floor tile or the like onto which the contour is to be transferred, then it will indicate not only the contour but also the position on the tile for cutting to form a perfect fit.

The bearing surface means may be constituted by ridging in the body and in a preferred form, the body has a first transverse ridge portion serving as a main seating, the frictional means being arranged to correspond therewith and urge the rods into engagement with the ridge.

2

The frictional means may be a resiliently compressible or bendable element disposed within the body, e.g. in corresponding position to the bearing surface, and bearing on the series of rods. Two bearing surfaces, and two friction means may be arranged in parallel positions in the body. The friction means may be a rubber or like rod or tube disposed between the body and the rods so as to lie transversely to the rods in a compressed state.

The body may be two portions of sheet material one of which includes one or more ridges as bearing surfaces and the other of which has one or more recesses forming a seating for rubber or like rods or tubes forming friction means.

Where the profile is of greater length than one such device, means may be provided for coupling the body portions of two or a plurality of such devices end to end with the rods thereof in the same or parallel planes, and may include a pivot permitting movement of one device with respect to the or each other to which it is coupled about an axis perpendicular to the plane of the rods, and releasable means for locking the coupled devices against pivoting.

Figure 2:
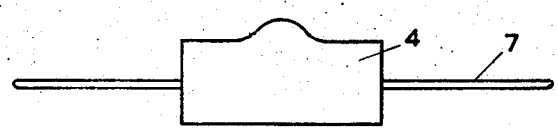
Figure 3:
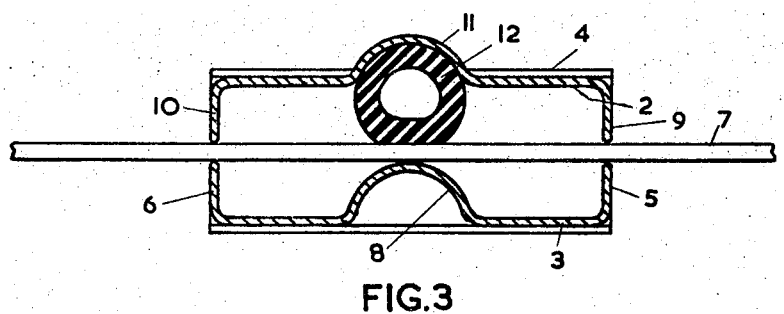
Figure 4:
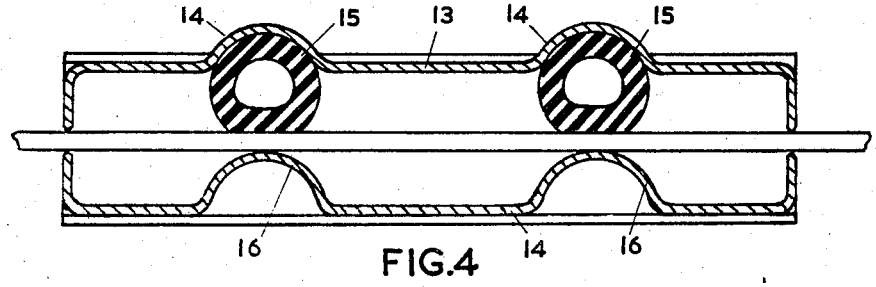
Figure 5:
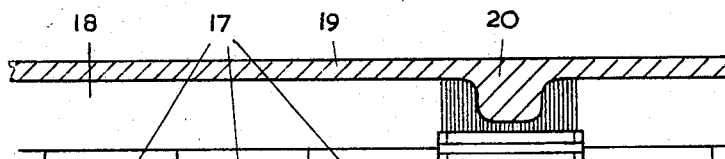
Figure 8:
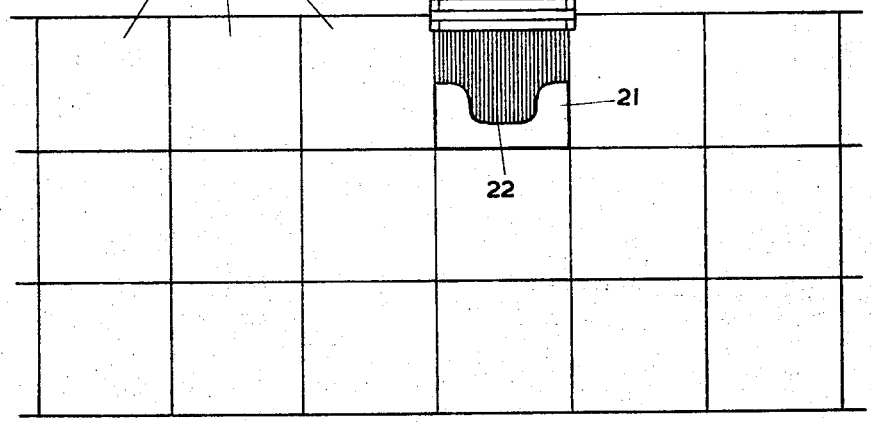
Figure 8:
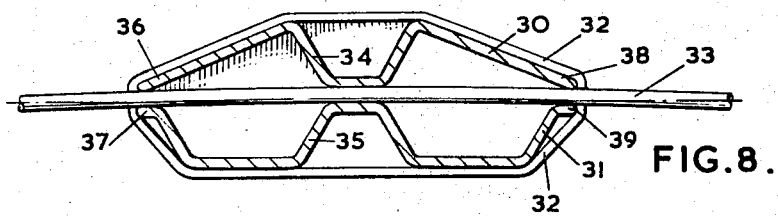
Figure 9:
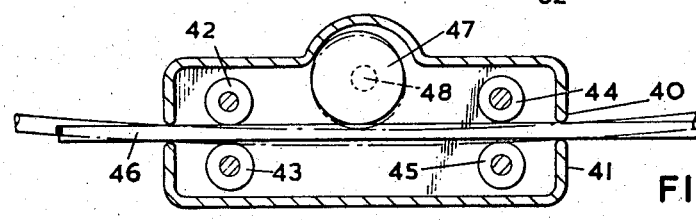
Figure 6:
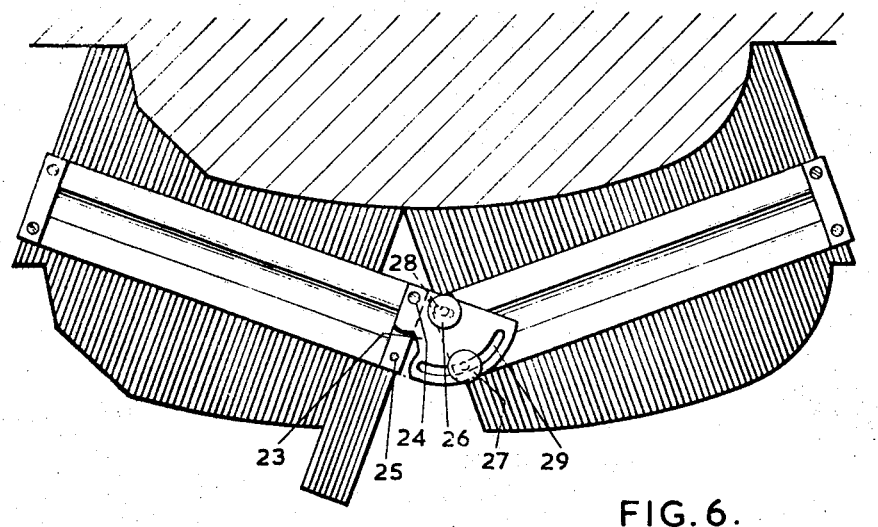
Figure 7:
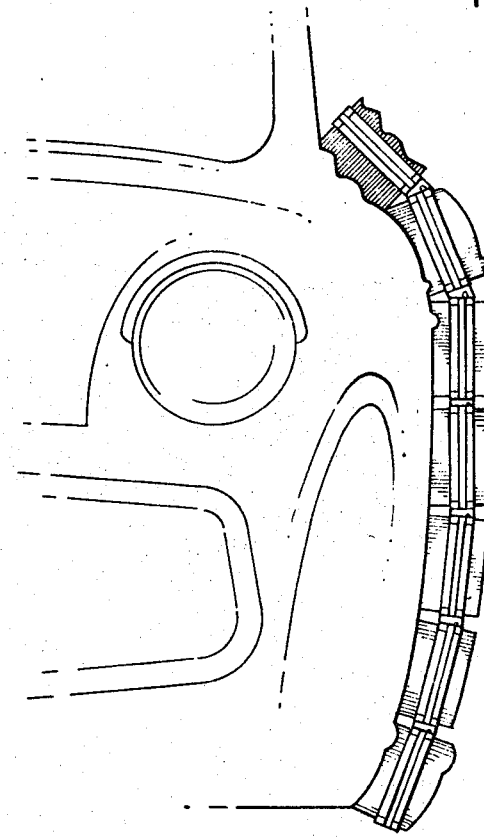

Two embodiments of profile transfer device, and their manner of use, are hereinafter described with reference to the accompanying drawings, wherein:

FIG. 1 is a plan view of a first embodiment.
FIG. 2 is a corresponding end elevation.
FIG. 3 is a transverse section, to a larger scale, corresponding to FIG. 2.
FIG. 4 is a section of a second embodiment having two fictional means and seatings for the rods.
FIG. 5 illustrates a method of use of a single device.
FIG. 6 illustrates the use of a double device.
FIG. 7 illustrates the use of a multiple device.
FIG. 8 is a transverse section of a further embodiment in which the needles are held in a bent condition.
FIG. 9 is a transverse section of yet another embodiment with a releasable locking means.

In FIGS. 1 to 3, the device comprises a body 1 with upper and lower sheet metal portions 2 and 3 secured by two end caps 4. The portion 3 is trough shaped and includes side walls 5, 6 as guides for the rods 7, and has a central hump portion 8 which serves as a bearing. The portion 2 has side walls 9, 10 serving, with the walls 5, 6 to provide two pairs of spaced guides, along each side of the body, between which the rods pass. The upper portion also has a central humped portion 11 aligned with the portion 8 and serving as a seating for a length 12 of rubber tubing which abuts frictionally on the rods 7. In FIG. 1 the rods are aligned in corresponding position; if either end is pushed up against a profile, e.g. moulded woodwork, the rods 7 slide through, under friction, and assume the counterpart of the profile being taken off. The other ends of the rods also assume the same profile.

In FIG. 4, the portion 13 is provided with humped portions 14 for two rubber tubes 15, and two humped portions 16 to receive longer rods 7a.

FIG. 5 shows a manner of use; assuming that a tiled floor (or square of linoleum etc.), is being laid, the last row of "field" tiles 17 leaves a smaller gap 18 between it and the skirting 19. A tile must be specially cut for a contoured moulding 20. The length and width of the rods corresponds to the length and width of the tile. To transfer the profile, the tile 21 is laid symmetrically on the last field tile opposite the moulding. The device is pressed against the moulding, and the rear "edge" 2 of the rods indicates the shape to be cut out and the correct position for cutting it.

FIG. 6 shows a method of taking the profile of a larger article, and two devices are coupled by a bracket 23 mounted on one of them by means of two screws 24, 25 at one end. The other device is pivotably coupled to the bracket by knurled screws 26, 27 one of which is disposed in a slotted hole 28 in the bracket and the other of which can be moved along an arcuate slot 29 and tightened in the desired position. The rods of both devices are in the same plane, but inversion of one device would place the rods in spaced parallel planes.

In FIG. 7 is shown a larger number of devices coupled in series, as in FIG. 6, and utilised for taking off a relatively very long and non-regular profile of a motor vehicle body.

In FIG. 8 the devices are constituted by longitudinal frames 30, 31 retained in assembled condition by end plates 32. Rods 33 are seated slidable between centre portions 34, 35 and pass between pairs of spaced guides constituted by edge portions 36, 37 and 38, 39 the rods being forced into a slightly bent shape so as to be frictionally held.

In FIGURE 9 of the drawing, there is shown an embodiment of profile transferring device comprising a body constituted by longitudinal frames 40, 41. A plurality of rods 46 are arranged in the body in side by side relationship in one plane and are longitudinally slidable through said body between two pairs of spaced guides constituted by rollers 42, 43 and 44, 45 mounted within the body. The rods are slidable across a friction means which is engaged between the body and the rods, and which is disposed between the roller pairs. Said friction means comprise a cam roller 47 rotatable about an eccentric axis 48 such that rotation of said cam roller in a first direction causes it to engage and lock the rods by bending them, and rotation of said cam roller in a second direction causes it to disengage from said rods. The whole may be made of stainless steel for medical use.

These devices described are small enough and robust enough to permit their handling as a tool rather than as a piece of special equipment, and they can be applied by tradesmen and others in very many fields where a non-regular or complex contour has to be dealt with.

I claim:

1. A profile transferring device comprising a body composed of two portions each of which includes a pair of spaced side walls, the body portions being disposed in superposed relationship with the respective side walls of each portion extending towards the side walls of the other portion and the free edges of pairs of adjacent side walls being spaced and defining an opening along each longitudinal side of the body, a pair of end pieces disposed one at each end of said body and engaged with said body portions to retain said portions in superposed relationship, one of said body portions including intermediate its side walls a first connecting wall, and formed in said first connecting wall at least one longitudinal depending ridge, which is a fixed rigid integral part of said first connecting wall, the apex of which is positioned, in the direction towards the other said body portion, beyond the plane containing the free edges of the side walls of said other body portion, and a plurality of resilient linear rods disposed through said body and projecting at each end through the said openings, said rods being in side by side relationship, and abutting on said ridge apex and on said free edges of said other body portion, whereby said rods are flexed and frictionally held in said body.

2. A profile transferring device comprising:
   (a) a body;
   (b) a plurality of rods arranged in the body in side by side relationship in one plane and longitudinally slidable through said body between two pairs of rollers mounted within said body, and across a friction means engaged between the body and the rods and between the roller pairs; and
   (c) said friction means comprising a cam roller between said pair of rollers, said cam roller being rotatable about an eccentric axis such that rotation of said cam roller in a first direction causes it to engage and lock the rods by bending them, and rotation of said cam roller in a second direction causes it to disengage from said rods.

3. A profile transferring device as claimed in claim 2 comprising a body having elongated bearing surface means, a plurality of rods arranged in the body in side by side relationship in one plane and longitudinally slidable through said body between two pairs of rollers mounted within said body and across a friction means engaged between the body and the rods and between the roller pairs so as to hold the rods against the bearing surface means, said friction means comprising a cam roller between said pairs of rollers, said cam roller being rotatable about an eccentric axis responsive to transverse movement of the rods whereby the cam roller engages and locks the rods when said rods slide longitudinally in a first direction and said cam roller disengages said rods when said rods slide in a second direction.

References Cited

UNITED STATES PATENTS

| 1,261,438 | 4/1918 | Reinhardt | 33—175 |
| 2,265,373 | 12/1941 | Johnson | 33—175 |
| 2,599,050 | 6/1952 | Emerson | 33—175 |
| 2,621,415 | 12/1952 | Cooper | 33—175 |
| 2,835,983 | 2/1958 | Razdow | 33—175 |
| 2,949,674 | 8/1960 | Wexler | 33—175 |

FOREIGN PATENTS 1,319,083  1/1963  France.

SAMUEL S. MATTHEWS, *Primary Examiner.*

UNITED STATES PATENT OFFICE
CERTIFICATE OF CORRECTION

Patent No. 3,419,965                                January 7, 1969

Ernest Francis Madden

It is certified that error appears in the above identified patent and that said Letters Patent are hereby corrected as shown below:

Column 4, line 3, cancel "other".

Signed and sealed this 1st day of December 1970.

(SEAL)
Attest:

Edward M. Fletcher, Jr.                        WILLIAM E. SCHUYLER, JR.
Attesting Officer                                       Commissioner of Patents